United States Patent [19]

Faulstich et al.

[11] 4,076,647
[45] Feb. 28, 1978

[54] OPTICAL GLASS

[75] Inventors: Marga Faulstich, Mainz; Franz Reitmayer, Drais, both of Germany

[73] Assignee: Jenaer Glaswerk Schott & Gen., Mainz, Germany

[21] Appl. No.: 598,137

[22] Filed: Jul. 22, 1975

[30] Foreign Application Priority Data

Jul. 24, 1974 Germany .............................. 2435554

[51] Int. Cl.² ...................... C09K 11/42; C09K 11/46; C03C 3/16
[52] U.S. Cl. ........................... 252/301.4 P; 106/47 Q; 252/301.6 P
[58] Field of Search ............ 106/47 RQ; 252/301.4 P, 252/301.6 P; 331/94.5 E

[56] References Cited

U.S. PATENT DOCUMENTS

| 2,393,469 | 1/1946 | Harley | 106/47 R |
|---|---|---|---|
| 2,996,391 | 8/1961 | Weissenberg et al. | 106/47 Q |
| 3,250,721 | 5/1966 | DePaolis et al. | 106/47 R |
| 3,328,181 | 6/1967 | Weidel | 106/47 R |
| 3,731,226 | 5/1973 | Switzer et al. | 331/94.5 E |
| 3,846,142 | 11/1974 | Buzhinsky et al. | 106/47 Q |
| 3,979,322 | 9/1976 | Alexev et al. | 106/47 Q |

*Primary Examiner*—Winston A. Douglas
*Assistant Examiner*—Mark Bell
*Attorney, Agent, or Firm*—Millen & White

[57] ABSTRACT

An optical glass with a path length independent of temperature comprises between 40 and 55% by weight $P_2O_5$, between 40 and 54% by weight BaO and between 6 and 12% by weight $Nb_2O_5$. Part of the BaO may be replaced by SrO or CaO. Minor amounts of $SiO_2$ or $B_2O_3$ may be included as may other metal oxides such as ZnO, $Sb_2O_3$ and $La_2O_3$.

6 Claims, No Drawings

OPTICAL GLASS

This invention relates to optical glass.

It is known that wave fronts are deformed in a glass if the optical path-lengths are different in different portions of the glass as a result of temperature gradients.

Optical instruments, e.g. in space vehicles, are at times subject to strong temperature differences resulting from radiation from the sun and reflection in space, besides emitted and/or reflected infra-red radiation of nearby planets. These temperature differences can cause wavefront deformation in the optical glass, said deformation considerably reducing the resolving power of the optical systems. Even in aerial photography and in laser technology, the temperature gradients arising there can lead to considerable wavefront deformation.

There is therefore a great interest in the provision of optical systems and components made of glass with an optical path length independent of temperature.

In plane parallel lenses or plane parallel laser rods, the change in optical path length resulting from a change in temperature is:

$$\Delta W = W_1 - W_2 = dx \{\alpha(n-1) + (dn/dt)\} \times \Delta t,$$

in which:

$d$ = thickness of the glass,
$n$ = refractive index of the glass,
$\alpha$ = coefficient of thermal expansion, and
$t$ = temperature.

A wavefront deformation is caused if $\Delta W$ is of different values at different portions of the optical component as a result of temperature gradients. From the above equation it can be seen that the optical path differences $\Delta W$ may be reduced by reducing the thickness of the glass component, the temperature difference $\Delta t$ or the value $G = (n-1)\alpha + (dn/dt)$. The value G is only dependent on the physical properties of the glass and should be as small as possible, 0 ideally.

The value of $(dn/dt)$ is dependent on the summation of two components:

1. The volume expansion of the glass resulting from an increase in temperature causes a change towards small refractive indices, i.e. a negative $(dn/dt)$ value.

2. The ultra-violet eigenfrequency $\lambda_o$ of the glass is moved to longer wave lengths by an increase in temperature and as a result, the refractive index is increased (positive $(dn/dt)$ values).

In most glass the second influence is predominant, i.e. the $(dn/dt)$ values are positive.

In order to obtain negative $(dn/dt)$ values, components must be incorporated in the glass which:

a. keep the temperature dependence of the ultraviolet eigenfrequency $(d\lambda_o/dt)$ as small as possible and/or
b. effect movement of the ultra-violet eigenfrequency $\lambda_o$ to short wave lengths.

According to the coefficient of thermal expansion $\alpha$ is implicitly contained in the $(dn/dt)$ value and there is accordingly a requirement for a high coefficient of thermal expansion $\alpha$. According to the requirement that $G = (n-1) \times \alpha + (dn/dt) = 0$ on the other hand, a $\alpha$ value which is as small as possible is desirable. This contrast shows the difficulties which arise in the development of glass with an optical path length that is independent of temperature.

It was found that the athermal wave aberration is not determined only by G but that the refractive index gradient resulting from thermal expansion, $\sigma_w$, also determines the wave aberration. Thereafter the "classic G-value" must be supplemented by a value $(\delta n/\delta \sigma) \times (d\sigma/dt)$ so that complete athermality may be achieved. This value can be kept low if $\alpha$, the modulus of elasticity and $(\delta n/\delta \sigma)$ of the glass are low. Generally $(\delta n/\delta \sigma) \times (d\sigma/dt)$ is positive so that, because of compensation, the "classic G-value" should be negative. The requirement for the "classic G-value" is thus nil or negative.

It is known that the incorporation of phosphorus in glass in conjunction with BaO causes the dependence on temperature of the ultra-violet eigenfrequency $d\lambda_o/dt$) to remain small and thus causes movement of $(dn/dt)$ towards negative values. Moreover, the eigenfrequency $\lambda_o$ moves towards smaller wave lengths with increasing $P_2O_5$ content so that an additional movement of $(dn/dt)$ is effected in a negative direction.

Alkaline earth phosphate crown glass is known with a high $v$, $v_e > 60$ (German Specification No. 1,596,854). Russian Patent Specifications Nos. 286,162 and 283,530 disclose the following flint glass in a narrow composition range:

a. a $BaO$-$PbO$-$La_2O_3$ phosphate glass containing alkali, wherein:

| | |
|---|---|
| $n_d$ 1.59 | $v_d$ 57.8 |
| $\dfrac{dn_e}{dt} \times 10^6/°C = -5.2,$ | $Ge_{abs} \times 10^6/°C = +0.8$ |
| $\alpha \times 10^7/°C \text{ abs} = 100$ | |
| $-30$ to $70°$ C | | b. a PbO-BaO glass containing alkali, wherein the PbO content is between 45 and 49% by weight and the maximum content of $Nb_2O_5$ is 5.5% by weight and:

| | |
|---|---|
| $n_d = 1.6942$ | $v_d = 35.7$ |
| $\alpha \times 10^7/°C = 127$ | |
| $-30 - +70°$ C | |

A disadvantage of a), the $BaO$-$PbO$-$La_2O_3$ phosphate glass, is the high $v_e$ value of between 57 and 58.

A disadvantage of b), the PbO-BaO phosphate glass, is the high coefficient of thermal expansion $\geq 127 \times 10^{-6}/°$ C.

Further publications about athermal phosphate flint glass with $v_e$-values $< 57$ are not on hand.

An object of the present invention is, therefore, the provision of an optical glass with a path length independent of temperature in the optical property range:

$n_e = 1.59$ to $1.65$
$v_e = 55$ to $46$.

This object is achieved according to the invention with glass which comprises the following components in weight %:

$P_2O_5$ = 40 to 55,
Alkaline earth oxides 40 to 54, and
$Nb_2O_5$ = 6 to 12.

with the % alkaline earth oxides + $Nb_2O_5$ at least 46.

It was found that by incorporating between 6 and 12% by weight $Nb_2O_5$, glass with a low $v$ is obtained, i.e. flint glass, without substantially reducing the athermal features of the glass, the content of alkaline earth oxides preferably BaO + $Nb_2O_5$ being $\geq 46\%$ by weight.

The use of small amounts of MgO > 5% by weight increases the tendency towards crystallization. BaO can be exchanged for SrO or CaO up to 15% by weight.

This exchange brings no advantages, on the contrary the $Ge_{abs} \times 10^6/°C$ -values increase.

The inclusion of alkali metal oxides up to 2% by weight should only act to improve the quality of the transmitted light and should only be added insofar as the coefficient of expansion $$\alpha \times 10^{7°}C$$
$$-30 - +70°C$$

does not exceed 123. In addition, the chemical resistance of the glass must not be reduced.

Inclusion of $TiO_2$ brings no advantage in this glass because of slight reduction by $P_2O_5$ and therefore a tendency to discolor. Inserting small amounts of $ZrO_2$ ($\geq$ 2% by weight) increases the tendency towards crystallization. Inserting PbO in amounts > 8% by weight increases the coefficient of expansion to $123 \times 10^{-7}/°C$ between $-30°$ and 70° C.

The following compositions have negative or "O" Ge-relationship and coefficients of expansion $\alpha \times 10^7/°C$ in the temperature range $-30°$ to 70° C. $\leq 123$.

EXAMPLE 1

| | | | |
|---|---|---|---|
| $P_2O_5$ | 40.0% by weight, | $n_e$ | = 1.63022 |
| BaO | 54.0% by weight, | and $v_e$ | = 53.8 |
| $Nb_2O_5$ | 6.0% by weight. | s | = 3.860 |
| | | $\alpha \times 10^7/°C$ $-30$ to 70° C | = 120.9 |
| | | $Tg °C$ | = 510 |
| | | $\frac{dn_e}{dt_{abs}} \times 10^6/°C$ | = $-9.53$ |
| | | $Ge_{abs} \times 10^6/°C$ | = $-1.91$ |

EXAMPLE 2

| | | | |
|---|---|---|---|
| $P_2O_5$ | 49.4% by weight, | $n_e$ | = 1.60152 |
| BaO | 44.3% by weight, | and $v_e$ | = 54.50 |
| $Nb_2O_5$ | 6.3% by weight. | s | = 3.493 |
| | | $\alpha \times 10^7/°C$ $-30$ to 70° C | = 113.4 |
| | | $Tg°C$ | = 460 |
| | | $\frac{dn_e}{dt_{abs}} \times 10^6/°C$ | = $-7.6$ |
| | | $Ge_{abs} \times 10^6/°C$ | = $-0.8$ |
| | | modulus of elasticity | = 4689 |
| | | Poisson's ratio | = 0.281 |

EXAMPLE 3

| | | | |
|---|---|---|---|
| $P_2O_5$ | 43.5% by weight, | $n_e$ | = 1.62165 |
| BaO | 48.5% by weight, | $v_e$ | = 53.01 |
| $Nb_2O_5$ | 6.0% by weight, | and s | = 3.74 |
| $WO_3$ | 2.0% by weight. | $\alpha \times 10^7/°C$ $-30$ to 70° C | = 115.4 |
| | | $Tg °C$ | = 495 |
| | | $\frac{dn_e}{dt_{abs}} \times 10^6/°C$ | = $-8.7$ |
| | | $Ge_{abs} \times 10^6/°C$ | = $-1.5$ |

EXAMPLE 4

| | | | |
|---|---|---|---|
| $SiO_2$ | 3.0% by weight, | $n_e$ | = 1.60723 |
| $P_2O_5$ | 47.0% by weight, | $v_e$ | = 52.37 |
| BaO | 42.0% by weight, | and s | = 3.49 |
| $Nb_2O_5$ | 8.0% by weight. | $\alpha \times 10^7/°C$ $-30$ to 70° C | = 108.2 |
| | | $Tg °C$ | = 482 |

| | |
|---|---|
| $\frac{dn_e}{dt_{abs}} \times 10^6/°C$ | = $-6.5$ |
| $Ge_{abs} \times 10^6/°C$ | = $+0.1$ |

EXAMPLE 5

| | |
|---|---|
| $P_2O_5$ | 43.5% by weight, |
| BaO | 40.5% by weight, |
| $Nb_2O_5$ | 6.0% by weight, and |
| $Sb_2O_3$ | 10.0% by weight. |

The inclusion of a large quantity of $Sb_2O_3$ increases the dependence of the degree of dispersion on the wave length of the incident light.

| | |
|---|---|
| $n_e$ | = 1.64793 |
| $v_e$ | = 46.58 |
| s | = 3.73 |
| $\alpha \times 10^7/°C$ $-30$ to 70° C | = 116.6 |
| $Tg °C$ | = 465 |
| $\frac{dn_e}{dt_{abs}} \times 10^6/°C$ | = $-7.04$ |
| $Ge_{abs} \times 10^6/°C$ | = $+0.51$ |

The inclusion of small proportions of up to 5% by weight of $SiO_2$, $B_2O_3$, ZnO, $La_2O_3$, $Ta_2O_5$, up to 3% by weight of $Al_2O_3$, or $WO_3$, or up to 2% by weight of $ZrO_2$, modifies the desired $n_e$ or $v_e$ value, the stability of crystallization and/or the chemical resistance of the glass, without the relationship:

$$Ge_{abs} \times 10^6/°C = +2.0$$

being exceeded.

The addition of 2–10% and $Nd_2O_3$ permits use of the glass in laser technology.

Phosphorus can be added as $P_2O_5$ or may be combined as ortho, meta, pyro-phosphate or hydrogen phosphate. The chemically pure commercially available compounds are used advisably so as to obtain colorless glass in each case. The melting conditions must be mildly oxidizing to avoid reduction.

The compositions can be melted in some cases in a quartz melting pot and all compositions can be melted in a platinum melting pot homogeneously and without difficulty.

EXAMPLE OF MELTING

A batch of 50 kg. is weighed out as follows:

| | Oxides | % by Weight | Raw Materials | kg. |
|---|---|---|---|---|
| | $P_2O_5$ | 41.54 | $Ba(PO_3)_2$ | 42.470 |
| | BaO | 52.39 | $BaCO_3$ | 5.705 |
| | $Nb_2O_5$ | 6.07 | $Nb_2O_5$ | 3.036 |
| as purifying means | $As_2O_3$ | 0.20 | $As_2O_3$ | 0.100 |

The batch is mixed well and introduced at between 1150° and 1180° C. into, for example, a 15 l. platinum melting pot, heated for about 3 hours at 1260° C. and 1 hour at 1100° C. and purified.

In addition it is stirred for about 1.5 hours at a temperature between 1100° C. and 970° C. and allowed to flow out in shapes of desired dimensions. The composition can also be produced in greater volume if desired.

Further examples are set out in Table 1, with their corresponding physical properties in Table 2.

The compositions according to the invention are in the following composition range:

| Oxides | Weight % |
|---|---|
| $P_2O_5$ | 40 to 55, |
| BaO | 25 to 54, |
| $Nb_2O_5$ | 6 to 12, |
| $SiO_2$ | 0 to 5, |
| $B_2O_3$ | 0 to 5, |
| $K_2O$ | 0 to 4, |
| MgO | 0 to 5, |
| CaO | 0 to 15, |
| ZnO | 0 to 5, |
| PbO | 0 to 8, |
| CdO | 0 to 15, |
| $Sb_2O_3$ | 0 to 15, |
| $Nd_2O_3$ | 0 to 10, |
| $Al_2O_3$ | 0 to 3, |
| $La_2O_3$ | 0 to 5, |
| $ZrO_2$ | 0 to 2, |
| $Ta_2O_5$ | 0 to 5, and |// 
| WO_3 | 0 to 3. |

-continued

| Oxides | Weight % |
|---|---|
| $WO_3$ | 0 to 3. | with the sum of the alkaline earth oxides + $Nb_2O_5$ at least than 46% by weight.

The glass from this composition range fulfills the following conditions besides those already mentioned:

The glass is distinguished by high stability of crystallization, which facilitates technical production of large optical components (minimum dimension 300 mm., thickness 60 mm.).

The glass according to the invention has a positive relative partial dispersion $(n_g - n_F)/(n_F - n_C) = P, gF$ compared to conventional glass of similar optical properties (see Table 3).

The modulus of elasticity (kp/cm$^2$) is between 5600 and 4600, and Poisson's ratio is between 0.270 and 0.300.

Table 1

| Oxide | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| $P_2O_5$ | 40,0 | 49,3 | 53,6 | 46,6 | 43,5 | 47,0 | 43,5 | 42,0 | 43,5 | 43,5 | 46,1 | 46,1 | 42,6 | 52,4 | 52,4 | 41,1 |
| BaO | 54,0 | 44,3 | 34,2 | 44,1 | 45,4 | 42,0 | 48,5 | 42,0 | 40,5 | 40,5 | 41,2 | 41,2 | 46,4 | 35,4 | 26,4 | 46,9 |
| $Nb_2O_5$ | 6,0 | 6,3 | 10,0 | 6,2 | 6,0 | 8,0 | 6,0 | 8,0 | 6,0 | 7,8 | 7,8 | 6,0 | 6,2 | 6,2 | 6,0 | — |
| $SiO_2$ | — | — | — | — | — | 3,0 | — | 3,0 | — | — | 2,9 | 2,9 | — | — | — | — |
| $B_2O_3$ | — | — | — | 3,0 | — | — | — | 5,0 | — | — | — | — | — | — | — | — |
| $K_2O$ | — | — | — | — | — | — | — | — | — | — | 2,0 | — | — | — | — | — |
| MgO | — | — | 2,0 | — | — | — | — | — | — | — | — | — | — | — | — | — |
| CaO | — | — | — | — | — | — | — | — | — | — | — | — | — | 6,0 | 15,0 | — |
| ZnO | — | — | — | — | — | — | — | — | — | — | — | 2,0 | — | — | — | — |
| PbO | — | — | — | — | 5,0 | — | — | — | — | — | — | — | — | — | — | — |
| CdO | — | — | — | — | — | — | — | — | 10,0 | — | — | — | — | — | — | — |
| $Al_2O_3$ | — | — | — | — | — | — | — | — | — | — | — | — | 3,0 | — | — | — |
| $Sb_2O_3$ | — | — | — | — | — | — | — | — | — | 10,0 | — | — | — | — | — | — |
| $WO_3$ | — | — | — | — | — | — | 2,0 | — | — | — | — | 2,0 | — | — | — | — |
| $Nd_2O_3$ | — | — | — | — | — | — | — | — | — | — | — | — | — | — | — | 6,0 |
| $As_2O_3$ | 0,1 | 0,1 | 0,2 | 0,1 | 0,1 | — | — | — | — | — | — | — | — | — | — | — |
| $Sb_2O_3$ | | | | | | | | | | | | | | | | |

Table 2

| Physical Properties | 1 | 2 | 3 | 4 | 5 | 6 | 7 | 8 |
|---|---|---|---|---|---|---|---|---|
| $n_e$ | 1,63022 | 1,60152 | 1,59693 | 1,61910 | 1,63126 | 1,60451 | 1,62165 | 1,62002 |
| $v_e$ | 53,8 | 54,5 | 50,9 | 53,4 | 50,9 | 52,5 | 52,9 | 53,1 |
| s | 3,86 | 3,493 | 3,256 | 3,663 | | 3,486 | 3,74 | 3,17 |
| $\alpha \times 10^7/°C$ $-30-+70°C$ | 120,9 | 113,4 | 94,4 | 118,0 | 119,7 | 108,2 | 115,4 | 94,8 |
| Tg °C | 510 | 460 | 487 | 500 | 490 | 482 | 500 | 586 |
| $\frac{dn_e}{dt_{abs}} \times 10^6/°C$ | $-9,5$ | $-7,6$ | $-4,1$ | $-8,2$ | $-9,4$ | $-6,5$ | $-8,6$ | $-4,9$ |
| $Ge_{abs} \times 10^6/°C$ | $-1,9$ | $-0,8$ | $+1,5$ | $-0,9$ | $-1,8$ | $+0,1$ | $-1,5$ | $+1,0$ |
| Physical Features | 9 | 10 | 11 | 12 | 13 | 14 | 15 | 16 |
| $n_e$ | 1,62873 | 1,64793 | 1,60579 | 1,61466 | 1,63021 | 1,59659 | 1,61130 | 1,62620 |
| $v_e$ | 52,5 | 46,6 | 52,8 | 51,9 | 53,1 | 54,9 | 55,0 | 55,9 |
| s | 3,787 | 3,727 | 3,492 | 3,566 | 3,770 | 3,323 | 3,305 | 3,664 |
| $\alpha \times 10^7/°C$ $-30-+70°C$ | 108,9 | 116,6 | 114,2 | 107,8 | 106,0 | 104,7 | 102,1 | 95,4 |
| Tg °C | 484 | 465 | 489 | 500 | 556 | 473 | 530 | 597 |
| $\frac{dn_e}{dt_{abs}} \times 10^6/°C$ | $-6,04$ | $-7,04$ | $-7,7$ | $-6,1$ | $-6,6$ | $-5,8$ | $-4,9$ | $-4,7$ |
| $Ge_{abs} \times 10^6/°C$ | $+0,81$ | $+0,51$ | $-0,80$ | $+0,5$ | $+0,1$ | $+0,4$ | $+2,1$ | $+1,2$ |

Table 3

| | $n_d$ | $v_d$ | $Pg, F$ | $\frac{dn_e}{dt_{abs}} \times 10^6/°C$ | $Ge_{abs} \times 10^6/°C$ |
|---|---|---|---|---|---|
| SSK 50 | 1,61795 | 52,61 | 0,5548 | + 1,4 | + 6,0 |
| BaLF 6 | 1,58904 | 53,01 | 0,5539 | + 3,0 | + 7,0 |
| N-9556 | 1,59631 | 52,96 | 0,5591 | − 6,1 | + 0,4 |
| 743842/1 | 1,63031 | 53,88 | 0,5581 | − 9,2 | − 1,4 |
| SK 9 | 1,61405 | 55,17 | 0,5505 | + 3,9 | + 5,5 |
| N-9056 | 1,60321 | 54,84 | 0,5555 | − 4,7 | + 1,3 |

We claim:

1. Optical glass with a path length substantially independent of temperature and optical properties within the range: $n_e = 1.59$ to 1.65, and $v_e = 55$ to 46, of which the value $Ge_{abs} \times 10^6/°C$ is not more than 2.0 and the coefficient of expansion $\alpha \times 10^7/°C$ is not more than 123 in the temperature range $-30°$ to 70° C, said glass having a modulus of elasticity (kp/cm²) of between 5600 and 4600, a Poisson's ratio of between 0.270 and 0.300, and consisting essentially of, in weight percent:

$P_2O_5$ = 40 to 55
$BaO$ = 25 to 54
$Nb_2O_5$ = 6 to 12
$SiO_2$ = 0 to 5
$B_2O_3$ = 0 to 5
$K_2O$ = 0 to 4
$MgO$ = 0 to 5
$CaO$ = 0 to 15
$ZnO$ = 0 to 5
$PbO$ = 0 to 8
$CdO$ = 0 to 15
$Sb_2O_3$ = 0 to 15
$Nd_2O_3$ = 0 to 10
$Al_2O_3$ = 0 to 3
$La_2O_3$ = 0 to 5
$ZrO_2$ = 0 to 2
$Ta_2O_5$ = 0 to 5
$WO_3$ = 0 to 3 with the sum of the alkaline earth oxides + $Nb_2O_5$ at least 46% by weight.

2. Optical glass according to claim 1, the content of BaO and $Nb_2O_5$ being at least 46% by weight.

3. Optical glass according to claim 1 containing no $Nd_2O_3$.

4. Glass according to claim 1, which contains between 2 and 10% by weight $Nd_2O_3$ for use in laser technology.

5. Optical glass according to claim 1, characterized in that the $Ge_{abs} \times 10^6/°C$-value is negative and the glass consists essentially of:

$P_2O_5$ = 40.0% by weight,
$BaO$ = 54.0% by weight, and
$Nb_2O_5$ = 6.0% by weight, with the following properties:

| | |
|---|---|
| $n_e$ = | 1.63022 |
| $v_e$ = | 53.8 |
| $s$ = | 3.860 |
| $\alpha \times 10^7/°C$ $-30 - 70°C$ = | 120.9 |
| $T_g °C$ = | 510 |
| $\dfrac{dn_e}{dt_{abs}} \times 10^6/°C$ = | $-9.53$ |
| $Ge_{abs} \times 10^6/°C$ = | $-1.91$ |

6. Optical glass according to claim 1, which consists essentially of:

$SiO_2$ = 3.0% by weight,
$P_2O_5$ = 47.0% by weight,
$BaO$ = 42.0% by weight, and
$Nb_2O_5$ = 8.0% by weight, with the following properties:

| | |
|---|---|
| $n_e$ = | 1,60723 |
| $v_e$ = | 52.37 |
| $s$ = | 3.49 |
| $\alpha \times 10^7/°C$ $-30 - 70°C$ = | 108.2 |
| $T_g °C$ = | 482 |
| $\dfrac{dn_e}{dt_{abs}} \times 10^6/°C$ = | $-6.5$ |
| $Ge_{abs} \times 10^6/°C$ = | $+0.1$ |

* * * * *